Feb. 9, 1937.　　　J. EVANS　　　2,070,528
LAUNDRY MACHINERY
Filed June 1, 1935　　　2 Sheets-Sheet 1

WITNESSES

INVENTORS
John Evans

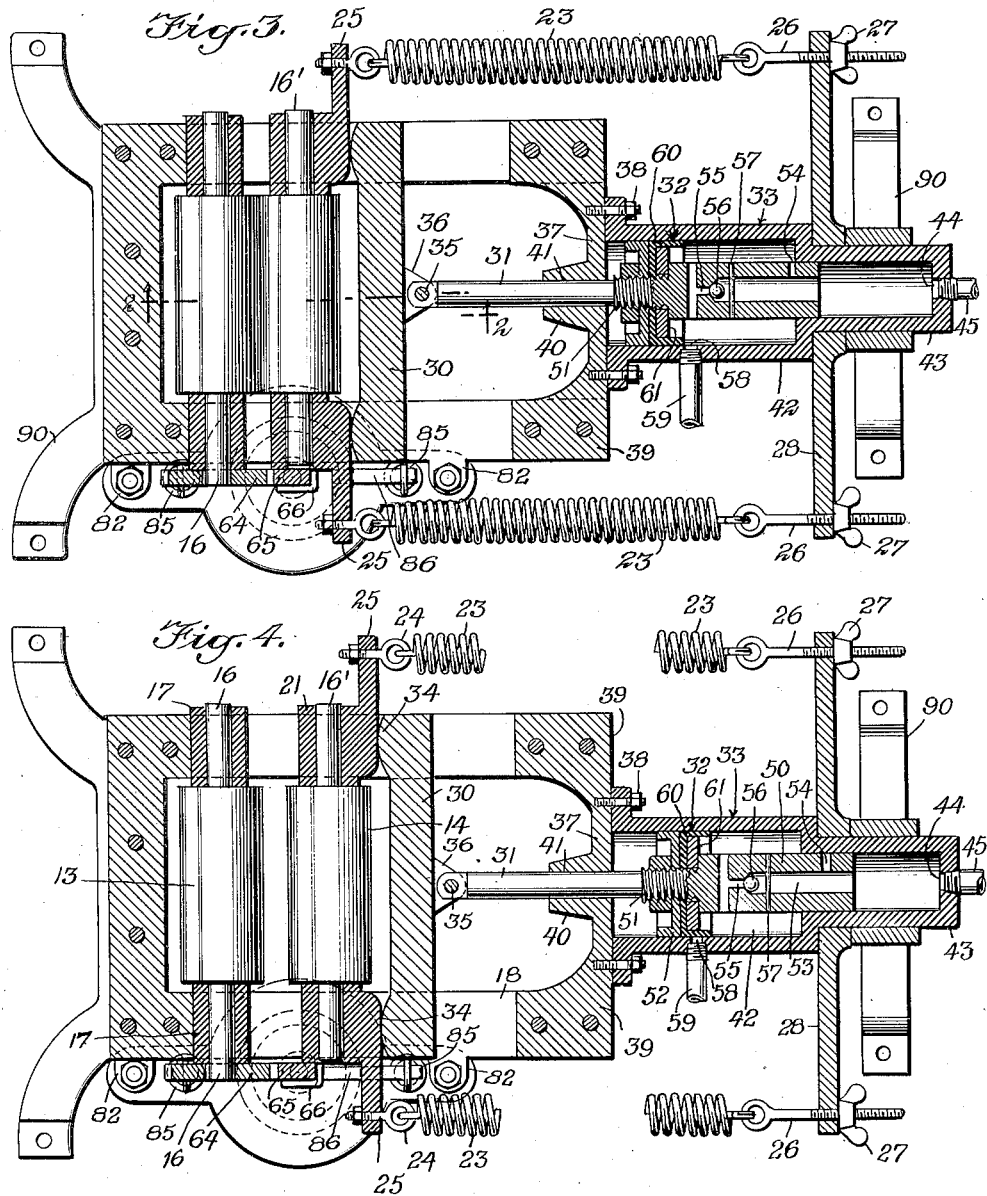

Patented Feb. 9, 1937

2,070,528

UNITED STATES PATENT OFFICE 2,070,528

LAUNDRY MACHINERY

John Evans, Salt Lake City, Utah

Application June 1, 1935, Serial No. 24,563

17 Claims. (Cl. 38—147)

This invention relates to improvements in laundry machinery, and has specific relation to starch applicators and extractors for use in laundering collars, cuffs, and the like.

Several types of starch applicators, all more or less unsatisfactory, have heretofore been made. It is an object of the present invention to provide an improved apparatus of this type of relatively simple and rugged construction which will overcome the difficulties heretofore encountered, and which will apply the proper amount of starch to the article being laundered without any substantial loss or waste of the starch.

It is a further object to provide an improved machine of this character which can be automatically operated, even by an inexperienced operator, and which practically eliminates the danger of bodily injury to the operator.

With these and other objects in view, reference should be had to the accompanying drawings, in which:

Fig. 3 is a sectional view in the direction of the arrows on the line 3—3 of Fig. 1, showing the rollers in operating position; and Fig. 4 is a view similar to Fig. 3 showing the rollers as in spaced relation prior to the starch extracting operation.

Figure 1:
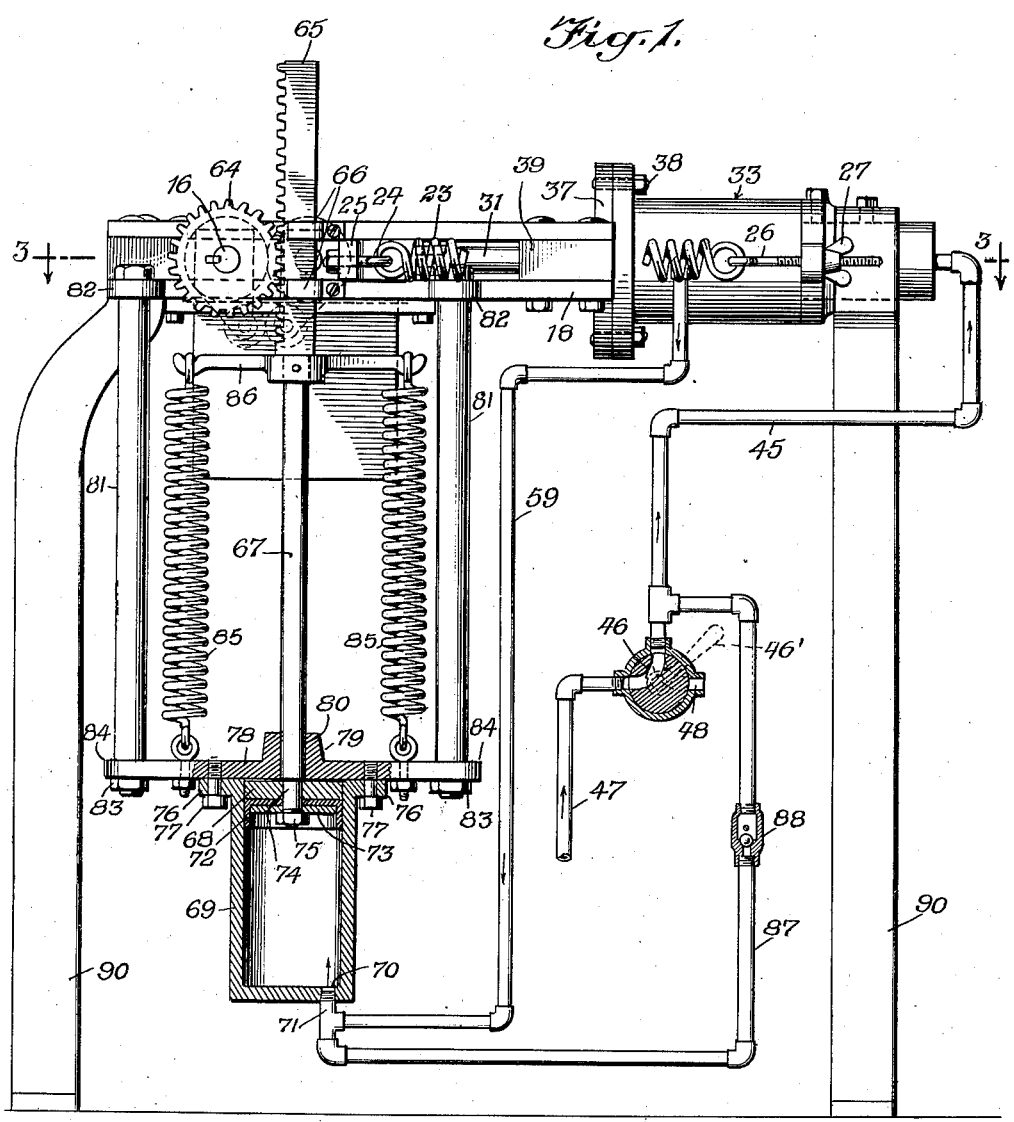
Fig. 1 is a side elevation partially in section of a starch applicator and extractor embodying the present invention.

My improved laundry machine includes a suitable container 10 for a starch preparation 11 having a pair of starch applying rollers 12 suitably supported adjacent the upper portion of the container 10 so as to be partly immersed in the starch preparation, and a pair of feed and starch extracting pressure rollers 13 and 14 respectively, supported above the container and arranged so that the collar, cuff, or other article to be starched may be inserted between the rollers 13 and 14 and the rollers 12 into the starch preparation 11 until the proper amount of starch has been absorbed, and then is slowly fed upwardly by the rollers. The rollers 12 are preferably approximately two-thirds submerged in the starch preparation and serve to cause the starch to penetrate through the article and be absorbed by the fabric, while the rollers 13 and 14 serve both as feed rollers and also as starch extractors to remove any surplus starch, the surplus starch being forced towards the end of the article being treated, and thence back into the container 10.

The rollers 13 and 14 are preferably covered with a layer of relatively hard rubber as shown at 15, while the rollers 12 may be formed of any suitable material such as relatively hard rubber. The rollers 13 and 14 are secured to suitable shafts 16 and 16', the shaft of the roller 13 being journalled at its two ends in suitable bearing blocks 17 which are fixedly mounted between horizontal cross pieces 18 formed adjacent the top on both sides of the machine. The bearing blocks 17 are formed with depending portions 19 in which the shaft 20 supporting one of the rollers 12 is journalled.

The shaft 16' of the roller 14 is journalled at its two ends in shiftable bearing blocks 21 which are disposed between and shiftable along the horizontal members 18. The bearing blocks 21 are provided with downwardly depending portions 22 in which the shaft 20 of the other roller 12 is journalled. The container 10 is suitably secured to the lower cross members 18 as by means of nuts and bolts. It will thus be seen that the horizontally disposed members 18 serve as supports for the apparatus and as guideways along which the bearing blocks 21 may slide, permitting the rollers 13 and 14 and likewise the rollers 12 to be shifted towards and away from each other.

A pair of tension springs 23, suitably supported at one end as by means of the screw-threaded eyes 24 to the projecting studs 25 formed integral with the bearing blocks 21, and at the other end by means of the adjustable screw-threaded eyes 26 and wing nuts 27 to the stationary yoke 28, serve to normally hold the rollers in spaced relation as shown in Fig. 4 so that the sleeve or other portion of a garment may be inserted between the rollers until the portion to be starched is immersed in the starch preparation 11 disposed in the container beneath the rollers. When the rollers 13 and 14 are in the separated position indicated in Fig. 4, the rollers 12 will likewise be in spaced relation.

After the article of wearing apparel has been inserted between the rollers and the portion to be starched has been immersed in the starch preparation, the rollers are then automatically forced together by means of the slide 30 supported for lateral shift movement between the horizontal members 18 and connected by means of a connecting rod 31 to a piston indicated generally at 32, which is operated in the cylinder 33 by means of suitable fluid pressure such as air pressure. The slide 30 is provided with convex abutment portions 34 which engage the shiftable bearing blocks 21, and it is pivotally secured to the connecting rod 31 as by means of a pin 35 extending through projecting ears 36 formed integral with the slide, and through the flat end portion of the connecting rod 31 so as to permit the roller to fluctuate to a slight degree when in operation to compensate for buttons or thickened portions of wearing apparel passing through the roller.

The cylinder 33 is connected at its inner end to a plate 37 by means of bolts 38, and the plate 37 is provided with laterally extending arms 39 connected to and serving as spacers for the horizontal strips 18 and is formed in its central portion with a conical projection 40 having an opening 41 therethrough through which the connecting rod 31 extends. The cylinder 33 is formed in two integral sections, a relatively large cylindrical section 42 and a relatively small cylindrical section 43, the latter being formed at its end with an opening 44 which is connected by means of piping 45, valve 46 and pipe 47 to a suitable source of fluid pressure such as an air compression pump or compression tank.

A suitable handle 46' is provided on the valve and it may be adjusted so as to connect the pipe 47 with the pipe 45, or to cut off the pipe 47 and connect the pipe 45 with the atmosphere through outlet 48. The piston 32 disposed inside the cylinder 33 is likewise formed in two sections, a larger section cooperating with the larger cylinder portion 42, and a smaller section cooperating with the small cylinder portion 43, and to this end the connecting rod 31 is preferably formed with an end portion 50 serving as the smaller piston, and with a threaded portion 51 on which the enlarged piston 52 is secured.

A cylindrical chamber 53 is formed in the smaller piston 50 and has a small duct 54 leading from one side thereof adjacent the top and a T-shaped duct 55 leading from the bottom thereof, while a ball check 56 retained in the chamber by means of the pin 57 is disposed at the entrance to the T-shaped duct 55.

It will be seen that when the valve handle has been turned to the position shown in the dotted line in Fig. 1, the compressed air will pass through the pipe 47, valve 46 and pipe 45 into the small cylinder 43. The parts will then be in the position indicated at Fig. 4 with the duct 54 facing the wall of the cylinder 43 and with the ball check 56 closing the T-shaped duct 55. The small piston 50 will be forced by the air pressure towards the left until the duct 54 reaches the end of the wall of cylinder 43, at which point the air pressure in cylinder 43 will escape through chamber 53 and duct 54 into the enlarged cylinder 42.

From this point on the shifting of the mechanism to the left will be caused by the operation of piston 52 in the enlarged portion of the cylinder. The wall of the enlarged cylinder 42 is provided with an outlet 58 which is connected by means of piping 59 to the automatic mechanism which causes the rotation of the rollers. The opening 58 is normally closed by means of a cup-shaped washer member 60 formed of leather or a suitable composition secured around the threaded portion 51 of the connecting rod 31 immediately above the piston 52. The cup-shaped member provides a close contact between the piston and cylinder wall and is preferably held in proper position by a metal disk or washer 61.

When the pistons have been shifted sufficiently to the left under the air pressure entering the cylinders through piping 45, the piston 52 will have moved sufficiently to uncover the outlet 58 as shown in Fig. 3, permitting some of the air under pressure to escape through piping 59.

The pistons, cylinders and ducts are so arranged that the initial shifting of the roller 14 to the left will be caused entirely by the operation of the air pressure upon the smaller piston 50 riding in the smaller cylindrical portion 43. The air pressure is so regulated as to overcome the tension of the springs 23. However, should the operator's fingers be caught between the rollers 13 and 14, the pressure will not be sufficient to crush or injure the fingers, and the duct 54 is so positioned that should the fingers of the operator be caught between the rollers none of the air can escape through duct 54 into the enlarged cylinder 42. The operator may thus either remove his fingers or turn the valve handle 47 to shut off the machine should his fingers thus be caught.

When the roller 14 has been shifted so that it almost contacts the roller 13, the duct 54 will pass the lower end of the wall of the cylinder 43, permitting the air under pressure to escape into the enlarged cylinder. Henceforth the shifting of the roller and the pressure of the roller is controlled by the piston 52 in the enlarged cylinder 42. Due to the greater size of piston 52 and cylinder 42, the roller 14 will be forced under greatly increased pressure into intimate engagement with roller 13, and when the parts have reached the position indicated in Fig. 3 with the piston 52 shifted sufficiently to open the duct 58, some of the air under pressure will then pass through piping 59 to the mechanism which causes the automatic rotation of the cylinders. It will thus be seen that the parts are so arranged that no injury can be done to the operator while the rollers are shifting, and that no rotation of the rollers occurs until they have been forced into intimate contact under high pressure. Outlet 58 should be small enough to prevent such a reduction of pressure in cylinder 42 as to cause the piston 52 and roller 14 to shift to the right under the tension of springs 23.

The mechanism for causing the rollers 13 and 14 to rotate after they have thus been forced into intimate contact comprises a pinion 64, keyed to the end of shaft 16 of the roller 13, which is engaged by a toothed rack 65 guided by the brackets 66, suitably secured to the cross members 18 and connected by means of connecting rod 67 to piston 68 disposed inside of cylinder 69, in the lower end of which is a threaded opening 70 connected by means of pipe 71 to the piping 59.

The piston is provided with a suitable leather or composition cupped washer 72 to insure a tight fit between the piston and the walls of the cylinder, and with a metal disk 73 for holding the cupped washer 72 in proper position. A reduced end portion 74 is provided at the end of the connecting rod 67, and the piston 68, washer 72 and disk 73 are fitted on this portion of the connecting rod and held in position as by means of a nut 75.

The upper end of the cylinder is provided with a laterally projecting flange 76 which is secured by means of bolts 77 to a closure plate 78. A conical projection 79 is formed adjacent the center of the closure plate and is provided with an opening 80 through which the connecting rod 67 extends. The cylinder is held in position by means of a pair of posts 81 secured at the upper end to a pair of ears projecting from one of the supporting cross pieces 18, and secured at the other end as by nuts 83 to laterally extending arms 84 formed integral with the closure plate 78.

Figure 2:
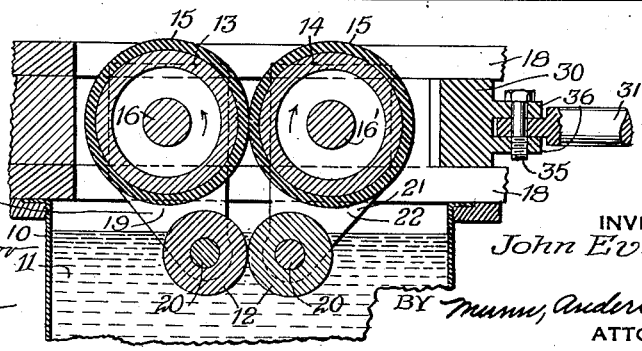
Fig. 2 is a cross section in the direction of the arrows on the line 2—2 of Fig. 3, showing in detail the starch applying and starch extracting rollers forming part of the present invention.

The piston, connecting rod and rack are normally held at the lower end of their stroke by means of tension springs 85 connected between the arms 84 and a yoke 86 which is secured to the connecting rod immediately beneath the rack 65. When the roller 14 has been shifted to the left into engagement with roller 13 and piston 52 has shifted sufficiently to uncover the duct 58 formed in the wall of the larger cylinder 42, air under pressure will pass through pipe 59, pipe 71, into cylinder 69, forcing the piston 68, connecting rod 67 and rack 65 upwardly to the position shown in Fig. 1. Because of the engagement between the teeth of rack 65 and the teeth of pinion 64, the roller 13 will be caused to rotate in feeding direction as indicated by the arrows in Fig. 2. Due to the frictional engagement between rollers 13 and 14, roller 14 will likewise be caused to rotate.

The article of wearing apparel, which had been inserted between the rollers with the portion to be starched immersed in the starch preparation 11, will be accordingly fed upwardly, first being pulled between the idling rollers 12 which squeeze the starch into the fabric, and then being fed between the rollers 13 and 14, forcing the surplus starch preparation downwardly and back into the container 10. The length of the rack and the relative size of the pinion 64 should be sufficient to cause the wearing apparel which is being treated to be fed through and be released by the rollers 13 and 14.

When the piston 68, connecting rod 67 and rack 65 have reached the top of their stroke, as shown in Fig. 1, the starch applying and extracting operation has been completed, and the handle 46' of valve 46 is turned to a position to cut off the air pressure in pipe 47 and to open the connection between piping 45 and the atmosphere through outlet 48.

Piping 87 is connected between the pipe 71 at the bottom of cylinder 69 and piping 45, and has a ball check 88 disposed therein so as to permit fluids to pass from piping 71 to piping 45, but to prevent the passage of fluids in the opposite direction. The air under pressure in cylinder 69 is thereby permitted to escape through piping 71, 87 and 45, the valve 46 and outlet 48. Springs 85 will pull the rack 65, connecting rod 67 and piston 68 back to their original position at the bottom of their stroke, forcing the air out as above described.

Simultaneously springs 23 will return the roller 14 to its original position in spaced relation with respect to roller 13, as shown in Fig. 4, the pistons 52 and 50 forcing the air through outlet 44, piping 45, valve 46 and outlet 48. Due to the T-duct 55 and ball check 56 formed in the piston 50, the air in the larger cylinder 42 can escape through chamber 53 even after duct 54 has entered the smaller cylinder 43.

The yoke 28 which supports the mountings for springs 23 is suitably secured around the smaller cylinder 43 in engagement with the shoulder formed by the larger cylinder 42. Suitable uprights or legs 90 are preferably secured to the cross members 18 and to the smaller cylinder 43 so as to support the machine at a convenient height.

The operation of the machine, which has been described in connection with the description of the apparatus, is relatively simple and may be controlled even by an inexperienced operator.

If the article to be starched, for example, is a shirt cuff, the shirt sleeve is inserted between the rollers when in spaced position, as shown in Fig. 4, until the cuff is immersed to the proper depth in the starch preparation 11 in container 10. The handle of valve 46 is then turned to supply air under pressure through pipe 45 into the smaller cylinder 43, which causes a slow moving of the roller 14 under relatively light pressure towards roller 13 until the duct 54 passes the end of the wall of cylinder 43, thereby preventing any injury to the fingers of the operator should they be caught between the rollers as previously described.

When the duct 54 passes the lower end of the wall of cylinder 43, the roller 14 will then be urged into engagement with roller 13 under relatively high pressure. The air under pressure will finally pass through duct 58 when the piston 52 has shifted sufficiently to the left as shown in Fig. 3, with the result that air under pressure will pass into cylinder 69, forcing the piston 68 and rack 65 upwardly, rotating the rollers in the direction of the arrows in Fig. 2, and feeding the shirt sleeve slowly upwardly. The cuff will first be pulled through idling rollers 12, which will force the starch into the cuffs, and then be fed through rollers 13 and 14, which will remove the surplus starch and cause it to fall back into the container 10. The handle of valve 46 is then turned to close the feed pipe 47 and open the outlet 48, permitting the air in the cylinders to escape and the rack 65 and roller 14 to return to their original position under the tension of springs 85 and 23.

It is to be understood, of course, that the mechanism for shifting the rollers relative to each other may be used in association with any type of rolling mechanism in which pressure rollers which are shiftable relative to each other are employed. It is also to be understood that many changes may be made in the illustrated and described apparatus without departing from the spirit of the invention.

I claim:

1. In a machine of the character described, a pair of pressure rollers shiftable relative to each other, means for shifting the rollers apart and normally holding them in spaced relation, means for shifting said rollers towards each other under relatively light pressure to a predetermined point, and means automatically operative upon the shifting of the rollers to the predetermined point for thereafter shifting the rollers towards each other and urging them into contact under relatively strong pressure.

2. In a machine of the character described, a pair of rotatable pressure rollers shiftable relative to each other, means for shifting said rollers apart and normally holding them in spaced relation, means including a relatively small piston disposed in a relatively small cylinder having connection with a source of fluid pressure for urging said rollers towards each other to a predetermined point under relatively light pressure, and means including a relatively large piston disposed in a relatively large cylinder having connection with a source of fluid pressure for thereafter shifting the rollers towards each other and urging them into intimate contact under relatively strong pressure.

3. In a machine of the character described, a pair of rotatable pressure rollers shiftable relative to each other, means for shifting said rollers apart and normally holding them in spaced relation, means including a relatively small piston disposed in a relatively small cylinder having connection with a source of fluid pressure for urging said rollers towards each other to a predetermined point under relatively light pressure, and means including a relatively large piston disposed in a relatively large cylinder for thereafter shifting the rollers towards each other and urging them into intimate contact under relatively strong pressure, said cylinders and pistons being provided with means for connecting the second cylinder to a source of fluid pressure after the first piston has shifted a predetermined distance.

4. In a machine of the character described, a pressure roller, a second pressure roller shiftable towards and away from said first pressure roller, means for shifting said rollers apart and normally holding them in spaced relation, means for shifting said second roller towards said first roller to a predetermined point under relatively light pressure, and means automatically operative upon the shifting of the second roller to the predetermined point for thereafter shifting said second roller towards said first roller under relatively strong pressure.

5. In a machine of the character described, a pressure roller, a second pressure roller shiftable towards and away from said first pressure roller, means for shifting said rollers apart and normally holding them in spaced relation, means including a relatively small piston disposed in a relatively small cylinder having connection with a source of fluid pressure for urging said second roller towards said first roller to a predetermined point under relatively light pressure, and means including a relatively large piston disposed in a relatively large cylinder having connection with a source of fluid pressure for thereafter shifting the second roller towards the first roller under relatively strong pressure.

6. In a machine of the character described, a pressure roller, a second pressure roller shiftable towards and away from said first pressure roller, means for shifting said rollers apart and normally holding them in spaced relation, means including a relatively small piston disposed in a relatively small cylinder having connection with a source of fluid pressure for urging said second roller towards said first roller to a predetermined point under relatively light pressure, and means including a relatively large piston disposed in a relatively large cylinder for thereafter shifting the second roller towards the first roller under relatively strong pressure, said cylinders and pistons being provided with means for connecting the second cylinder to a source of fluid pressure after the first piston has shifted a predetermined distance.

7. In a machine of the character described, a pair of pressure rollers shiftable relative to each other, means for shifting the rollers apart and normally holding them in spaced relation, means for shifting said rollers towards each other, and means controlled by said second named means for causing said rollers to rotate after they have been shifted to a predetermined position.

8. In a machine of the character described, a pair of pressure rollers shiftable relative to each other, means for shifting the rollers apart and normally holding them in spaced relation, means including a piston disposed in a cylinder having connection with a source of fluid pressure for shifting said rollers towards each other, and means including a second piston disposed in a second cylinder for causing said rollers to rotate, said first mentioned cylinder and piston being provided with means for connecting the second cylinder to a source of fluid pressure after the first piston has shifted a predetermined distance.

9. In a machine of the character described, a pressure roller, a second pressure roller shiftable towards and away from said first pressure roller, means for shifting said rollers apart and normally holding them in spaced relation, means for shifting said second roller towards said first roller to a predetermined point under relatively light pressure, means for thereafter shifting said second roller towards said first roller and urging the rollers into intimate contact under relatively strong pressure, and means controlled by said last named means for causing said rollers to rotate after they have been urged into intimate contact.

10. In a machine of the character described, a pressure roller, a second pressure roller shiftable towards and away from said first pressure roller, means for shifting said rollers apart and normally holding them in spaced relation, means including a relatively small piston disposed in a relatively small cylinder having connection with a source of fluid pressure for shifting said second roller towards said first roller to a predetermined point under relatively light pressure, means including a relatively large piston disposed in a relatively large cylinder having connection with a source of fluid pressure controlled by said relatively small piston and cylinder for thereafter shifting the second roller towards the first roller and urging the rollers into intimate contact under relatively strong pressure, and means including a third piston disposed in a third cylinder having connection with a source of fluid pressure controlled by said relatively large piston and cylinder for causing said rollers to rotate after they have been urged into intimate contact.

11. A starch applying and extracting machine comprising a container for a starch preparation, a pair of idling pressure rollers disposed in said container so as to be partly immersed in the starch preparation, a second pair of pressure rollers disposed outside said container and positioned with respect to said first mentioned rollers to be cooperable to feed fabric immersed in the starch preparation through both pairs of rollers, and means for rotating said last mentioned rollers.

12. A starch applying and extracting machine comprising a container for a starch preparation, a pair of idling pressure rollers shiftable relative to each other and disposed in said container so as to have portions immersed in the starch preparation, a second pair of pressure rollers shiftable relative to each other and disposed above said first mentioned rollers, means for shifting the rollers in both pairs apart and normally holding them in spaced relation, means for shifting said rollers towards each other, and means for causing the second pair of rollers to rotate after the rollers have shifted to a predetermined point.

13. A starch applying and extracting machine comprising a container for a starch preparation, a pair of idling pressure rollers shiftable relative to each other and disposed in said container so as to have portions immersed in the starch preparation, a second pair of pressure rollers shiftable relative to each other and disposed outside said container above said first mentioned rollers, means for shifting the rollers in both pairs apart and normally holding them in spaced relation, means for shifting the rollers in both pairs toward each other to a predetermined point under relatively light pressure, means for thereafter shifting the rollers in both pairs towards each other under relatively strong pressure, and means for causing the second pair of rollers to rotate after the rollers in both pairs have been shifted into contact with each other.

14. A starch applying and extracting machine comprising a container for a starch preparation, a pair of pressure rollers shiftable relative to each other and disposed so as to have portions immersed in the starch preparation in said container, a second pair of pressure rollers shiftable relative to each other and disposed outside said container adjacent said first mentioned rollers, means for shifting the rollers in both pairs apart and normally holding them in spaced relation, means including a relatively small piston disposed in a relatively small cylinder having connection with a source of fluid pressure for shifting said rollers in both pairs towards each other to a predetermined point under relatively light pressure, means including a relatively large piston disposed in a relatively large cylinder having connection with a source of fluid pressure controlled by said relatively small piston and cylinder for thereafter shifting said rollers towards each other and urging them into contact under relatively strong pressure, and means including a third piston and cylinder having connection with a source of fluid pressure controlled by said relatively large cylinder and piston for causing the second pair of rollers to rotate after the rollers in both pairs have been shifted into contact with each other.

15. A starch applying and extracting machine comprising a pair of shiftable rollers, and means for shifting said rollers relative to each other, said means including mechanism for shifting said rollers towards each other to a predetermined point under relatively light pressure, and means automatically operative upon the shifting of the rollers to the predetermined point for thereafter shifting the rollers towards each other and urging them into intimate contact under relatively strong pressure.

16. A starch applying and extracting machine comprising a pair of shiftable rollers, and means for shifting said rollers relative to each other, said means including a relatively small piston disposed in a relatively small cylinder having connection with a source of fluid pressure for shifting said rollers towards each other to a predetermined point under relatively light pressure, and a relatively large piston disposed in a relatively large cylinder having connection with a source of fluid pressure, and controlled by said relatively small piston and cylinder for thereafter shifting said rollers towards each other and urging them into contact under relatively strong pressure.

17. In apparatus for starching fabric articles and the like, a container for a starch preparation, means including a pair of idling pressure rollers disposed in said container for applying starch to the article being treated, and means including a pair of pressure feed rollers disposed above the first rollers for feeding the article being treated through the first rollers and for removing the surplus starch from the article.

JOHN EVANS.